(12) United States Patent
Cauvin et al.

(10) Patent No.: US 7,185,017 B1
(45) Date of Patent: Feb. 27, 2007

(54) SYSTEM AND METHOD FOR SELECTIVELY PROCESSING DATA SUB-SEGMENTS USING A DATA MASK

(75) Inventors: Kenneth L. Cauvin, Livonia, MI (US); Irene A. Ford, Plymouth, MI (US); Gary J. Michalek, Northville, MI (US)

(73) Assignee: Compuware Corporation, Detroit, MI (US)

( * ) Notice: Subject to any disclaimer, the term of this patent is extended or adjusted under 35 U.S.C. 154(b) by 298 days.

(21) Appl. No.: 10/120,573

(22) Filed: Apr. 10, 2002

(51) Int. Cl.
*G06F 7/00* (2006.01)
*G06F 17/00* (2006.01)

(52) U.S. Cl. .................. 707/101; 707/2; 707/100; 707/103 R (58) Field of Classification Search ........... 707/101, 707/100, 102, 6, 201, 10, 3
See application file for complete search history.

(56) References Cited

U.S. PATENT DOCUMENTS

| | | | | |
|---|---|---|---|---|
| 6,502,101 | B1 * | 12/2002 | Verprauskus et al. | 707/101 |
| 6,636,873 | B1 * | 10/2003 | Carini et al. | 707/201 |
| 6,691,127 | B1 * | 2/2004 | Bauer et al. | 707/102 |
| 2001/0011247 | A1 * | 8/2001 | O'Flaherty et al. | 705/39 |

OTHER PUBLICATIONS

Hurwitz et al., Programming ASP.Net, Feb. 2002, O'Reilly.*
Compuware, "Press Release: Compuware Announces Innovative New Software for Enterprise Data Privacy," May 13, 2002, [online] [Retrieved on Aug. 27, 2006] Retrieved from the Internet <URL:http://www.compuware.com/pressroom/news/2002/1349_ENG_HTML.htm>.
Compuware, "Release Announcement: File-AID/Data Solutions® from Compuware," Document No. CWDAAX3D, Feb. 14, 2002.
IBM, "Chapter 1.5.1.9: Reference Modification" from "Language Reference: IBM COBOL for MVS® & VM, IBM COBOL Set for AIX®, IBM VisualAge® COBOL, Fifth Edition," Document No. SC26-4769-04, Nov. 1998.
IBM, "Chapter 5.3.11: PICTURE clause" from "Language Reference: IBM COBOL for MVS® & VM, IBM COBOL Set for AIX®, IBM VisualAge® COBOL, Fifth Edition," Document No. SC26-4769-04, Nov. 1998.
IBM, "Chapter 5.3.12: REDEFINES clause" from "Language Reference: IBM COBOL for MVS® & VM, IBM COBOL Set for AIX®, IBM VisualAge® COBOL, Fifth Edition," Document No. SC26-4769-04, Nov. 1998.

* cited by examiner

*Primary Examiner*—Sam Rimell
*Assistant Examiner*—Jacob F. Betit
(74) *Attorney, Agent, or Firm*—Fenwick & West LLP (57) ABSTRACT

A data processing application for selectively processing data sub-segments using a data mask. Data segments are retrieved from a data source and pre-processed to include selected data sub-segments based upon the data mask. The masked data segments are communicated to a processor for processing. The excluded data sub-segments, if any, may be recombined with the processed data in post-processing, also using the data mask. Systems, methods, and articles of manufacture embodying the invention are described.

12 Claims, 4 Drawing Sheets

SYSTEM AND METHOD FOR SELECTIVELY PROCESSING DATA SUB-SEGMENTS USING A DATA MASK

BACKGROUND OF THE INVENTION

1. Field of the Invention

The invention relates to the field of data processing applications. Specifically, the invention relates to selecting data from data sources and communicating the selected data to processes with predefined input syntax.

2. Description of the Related Art

Data processing frequently involves retrieving stored data, processing the retrieved data, and storing or otherwise using the processed data. These functions may be embodied in a data processing application that is part of a larger data processing system. In many cases, the process is independent from the storage and retrieval system and a predefined syntax is used to communicate data between the two. Some storage and retrieval systems restrict how data is stored and retrieved. For example, a storage and retrieval system may group data into files, records, and fields, and typically access to the data at the field level or higher. Similarly, the process itself may only accept and return field level data. Accordingly, the syntax for communicating the data to the process may also be limited to field level data. The lowest level data sets handled by a storage and retrieval system, process, or communication syntax may be referred to as a data segment. In the example above, the data segments are fields.

For additional understanding of the limitations in some data processing systems, a look at how digital data is stored may be instructive. Digital data is frequently stored in one or more data sources, such as a database or data warehouse. The data may be stored according to a variety of data structures corresponding to physical memory locations. The physical data structure may, in turn, correspond to one or more storage/access structures, such as a file structure or hierarchical or relational database structure. For example, the data may be divided into files, which are divided into records, which are divided into fields. Fields may actually include a sequence of bits (1s and 0s). Depending on the data type of the field, the sequence of bits may be translated into another format, such as integers, floating point numbers, strings, logic values, or other formats. Fields may be viewed as being composed of one or more sub-segments based upon their data type. For example, an integer or floating point number may include one or more decimal digits, a string may include one or more characters. These individual decimal digits or characters are the field's sub-segments. Sub-segments may correspond directly to a fixed number of bits, such as characters corresponding to bytes, packed decimal digits corresponding to four bit nibbles, or Boolean or binary data corresponding to a single bit. Other data, such as some integers, may be stored in variable bit length sub-segments. Fields may also include one or more bits corresponding to other information, such as a sign or the location of a decimal point. In some cases, this additional information may be coded into a particular sub-segment in the field. Other data processing systems may handle data using data segments other than fields that are similarly composed of sub-segments.

It may be desirable to process only a portion of the data segment, in other words, to process a sub-segment or a group of sub-segments. For example, a user may only want to enact a process on the first three characters (three sub-segments) of a string field (the segment). Many data processing systems are not designed to easily retrieve, communicate, or process sub-segments. Further, many processes are designed to receive and operate on data segments and do not include logic for selectively handling sub-segments. It may be difficult to select only a portion of the field's data for processing in some systems.

One environment in which processing sub-segments of data segments is sometimes desirable is within a mainframe processor connected to one or more data sources, for example, an IBM™ mainframe connected to a storage area network, wherein a data processing application accesses data stored in one or more storage and retrieval platforms. For example, data in the data sources may be stored according to the record layouts of one or more high level programming languages, such as COBOL or PL/I. The application may allow a user to identify a file, identify a record layout, select a field, select a process to be executed on that field, and specify what is to be done with the output (e.g., update the field, store results elsewhere, pass the results to another process, etc.). The process may include one or more black box functions accepting a predefined set of parameters according to a predefined syntax. Prior applications have not provided a way to select sub-segments as one of the parameters for processing.

In the past, there have been two common solutions to the lack of sub-segment processing. One solution was to write a specific application to select the sub-segments and process the sub-segments in the desired way. This solution had to be applied to every file format that required sub-segment processing. The need for substantial, repeated application development time and associated costs makes this solution less desirable.

The other solution was to create alternate record layouts, reformat the data to the new format, process the files, and then reformat them back to the original formats. Again, this solution would have to be applied to every file format that required sub-segment processing. It would also require substantial, repeated development time for the new layouts, though probably less development time than the first solution. However, it would also require additional processing time since the files would have to be processed three times, and would require additional storage space for the reformatted files.

A data processing application that allows easy selection and processing of sub-segments from within the data processing system's data segments is desirable. A solution that does not require the development of separate applications or record layouts for each file format would be a vast improvement over the prior solutions.

SUMMARY OF THE INVENTION

The embodiments of the invention described below provide systems and methods for processing selected data sub-segments. More specifically, aspects of a data processing application that retrieves data segments from a data source and initiates one or more processes on those data segments are described. The data processing application allows the user to select one or more data sub-segments for processing by defining a field mask. The field mask excludes undesired data sub-segments from the data segment before the data segment is submitted for processing. Once processing is complete, the excluded data sub-segments may be reintegrated with the processed data before being stored back to the data source or otherwise used. Thus, embodiments may include a combination of pre-processing and post-processing functions for handling the data segments.

The field mask allows the user to selectively process portions of the data segments using a segment level processing function.

The embodiments may include the use of a data mask corresponding to the data sub-segments of the original data segment. The data mask includes a series of sub-segment masks that determine whether a corresponding data sub-segment is included in or excluded from the processing. The data mask may be used both for pre-processing the original data segment to remove excluded data sub-segments and post-processing the original data segment to return the reintegrated excluded data sub-segments and the processed data segment into the original data segment.

The process may be initiated by communicating a set of parameters built during pre-processing. Generally, the parameters would include, among other things, the data segment and information about its data format. However, pre-processing to remove excluded data sub-segments may change the data format. Pre-processing may include providing the data format of the data segment after exclusion of selected data sub-segments.

The data sub-segments of the data segment may not correspond directly to the data format in which the data segment is stored. As part of the pre-processing, the data segment may need to be converted from one data type to another. Data sub-segments are excluded from the converted data segment and the converted data segment is provided for processing, along with a data format corresponding to the converted data. After the converted data is processed, it may be reintegrated with the data sub-segments excluded from the converted data. The reintegrated data may then be converted back to the original data format.

Some embodiments of the invention are methods of processing data, data processing systems, and computer readable storage media.

BRIEF DESCRIPTION OF THE DRAWINGS

These and other features of the invention's embodiments are more fully described below. Reference is made throughout the description to the accompanying drawings, in which.

DETAILED DESCRIPTION OF THE INVENTION

Figure 1:
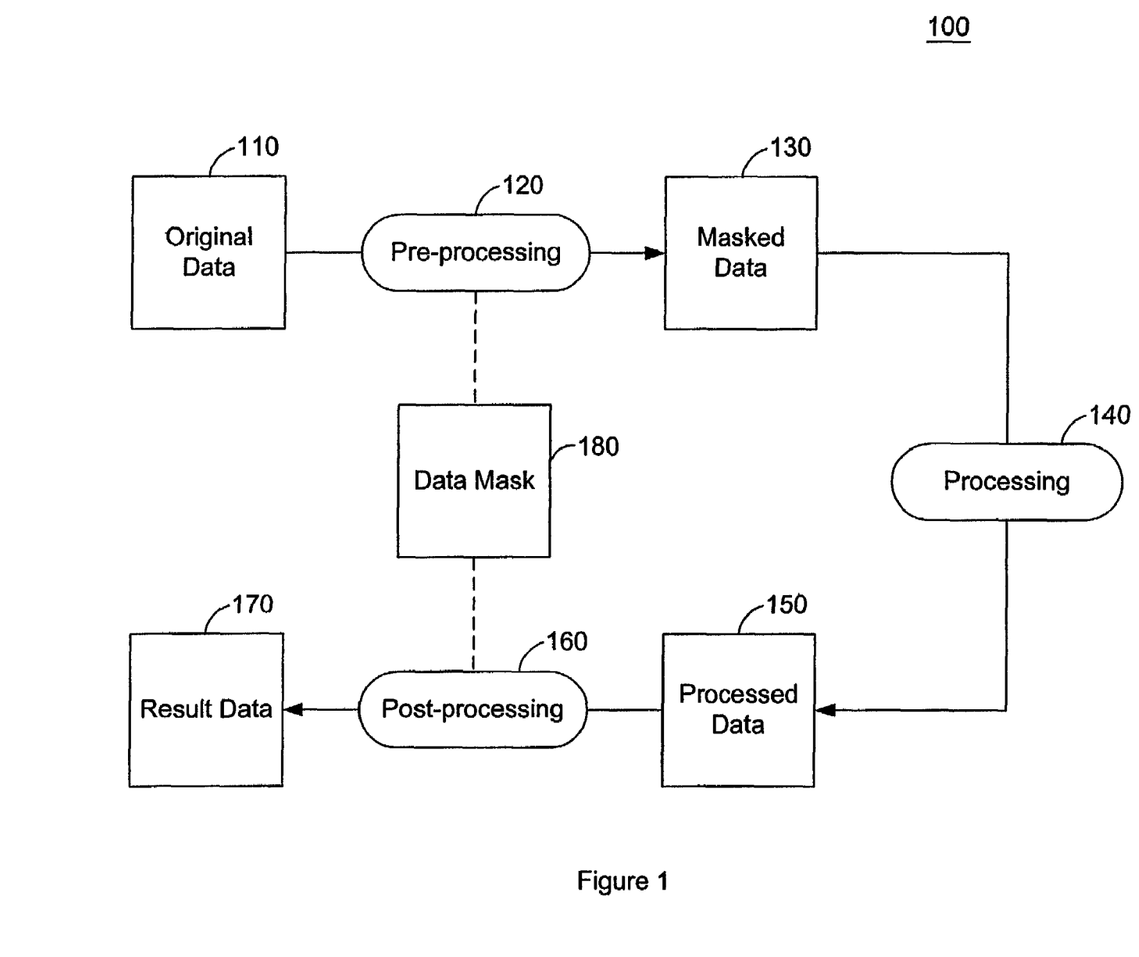
FIG. 1 is a block diagram of an example system for processing data using a data mask.

FIG. 1 shows a data processing system 100 that provides selective processing of data sub-segments within data segments. An original data segment 110 goes through pre-processing 120 to generate a masked data segment 130. The masked data segment 130 goes through processing 140 to generate a processed data segment 150. The processed data segment 150 goes through post-processing 160 to generate a result data segment 170. Both the pre-processing 120 and the post-processing 160 utilize a data mask 180 for carrying out their activities.

The original data segment 110 is a data segment corresponding to a number of data sub-segments. For example, the original data segment 110 may be an integer field ("12345") composed of a series of decimal digits ("1", "2", "3", "4", and "5").

The pre-processing 120 prepares the original data segment 110 for the processing 140. The original data segment 110 includes data sub-segments that a user does not desire to have processed by the processing 140. The pre-processing 120 utilizes the data mask 180 to identify which data sub-segments should be excluded from submission to the processing 140. For example, the data mask 180 may be a series of Boolean placeholders ("YNYNY"), where one value ("Y") indicates that the corresponding sub-segment should be included and the other value ("N") indicates that the corresponding sub-segment should be excluded. The pre-processing 120 generates the masked data segment 130 by excluding the data sub-segments identified for exclusion by the data mask 180. For example, the pre-processing 120 may move the included data sub-segments into masked data segment 130 but pass over the excluded data sub-segments. The pre-processing 120 may also convert the data type of the original data segment 110 in generating the masked data segment 130.

The masked data segment 130 includes the data sub-segments from the original data segment 110 that are not excluded by the pre-processing 120. For example, original data "12345" pre-processed through data mask "YNYNY" would generate masked data "135". The "2" and "4" are excluded by the pre-processing 110. The data type and data length of the masked data segment 130 may be different from the data type and data length of the original data segment 110.

The processing 140 is performed by a segment level data processing function. It receives a data segment as input, the masked data segment 130, for example. It also returns a data segment as output, the processed data segment 150, for example. The processing 140 is a black box function of known input parameters and output parameters, but may have an unknown purpose and operation. The processing 140 is entirely independent of the pre-processing 110 and post-processing 150. The processing 140 handles the masked data segment 130 just as it would have handled the original data segment 110. The processing 140 is executed based upon the received masked data segment 130 and generates the processed data segment 150 as a result. The processing 140 may generate other results as well.

The processed data segment 150 is a data segment returned by the processing 140 based upon its function. For example, if the processing 140 was a function that inverted the order of the data sub-segments within and the masked data segment 130 was "135", the processed data segment 150 would be "531".

The post-processing 160 reintegrates the data excluded from the mask data segment 130 with the processed data segment 150. The post-processing 160 utilizes the data mask 180 to determine how the data sub-segments of the processed data segment 150 are combined with the data sub-segments from the original data segment 110. For example, data sub-segments that were not identified for exclusion from the processing 140 may be overwritten by the data sub-segments of the processed data segment 150. Data sub-segments that were identified for exclusion may be passed over. Thus, the data mask determines the positions of the reintegrated data sub-segments. The resulting data segment is the result data segment 170.

The result data segment 170 is a combination of the original data segment 110 and the processed data segment 150. For example, where the data sub-segments "2" and "4"

from the original data segment 110 were excluded from the masked data segment 130 and the processed data segment 150 is "531", the result data segment 170 based upon the data mask 180 "YNYNY" would be "52341". The data type and data length of the result data segment 170 is generally the same as the data type and data length of the original data segment 110.

Figure 2:
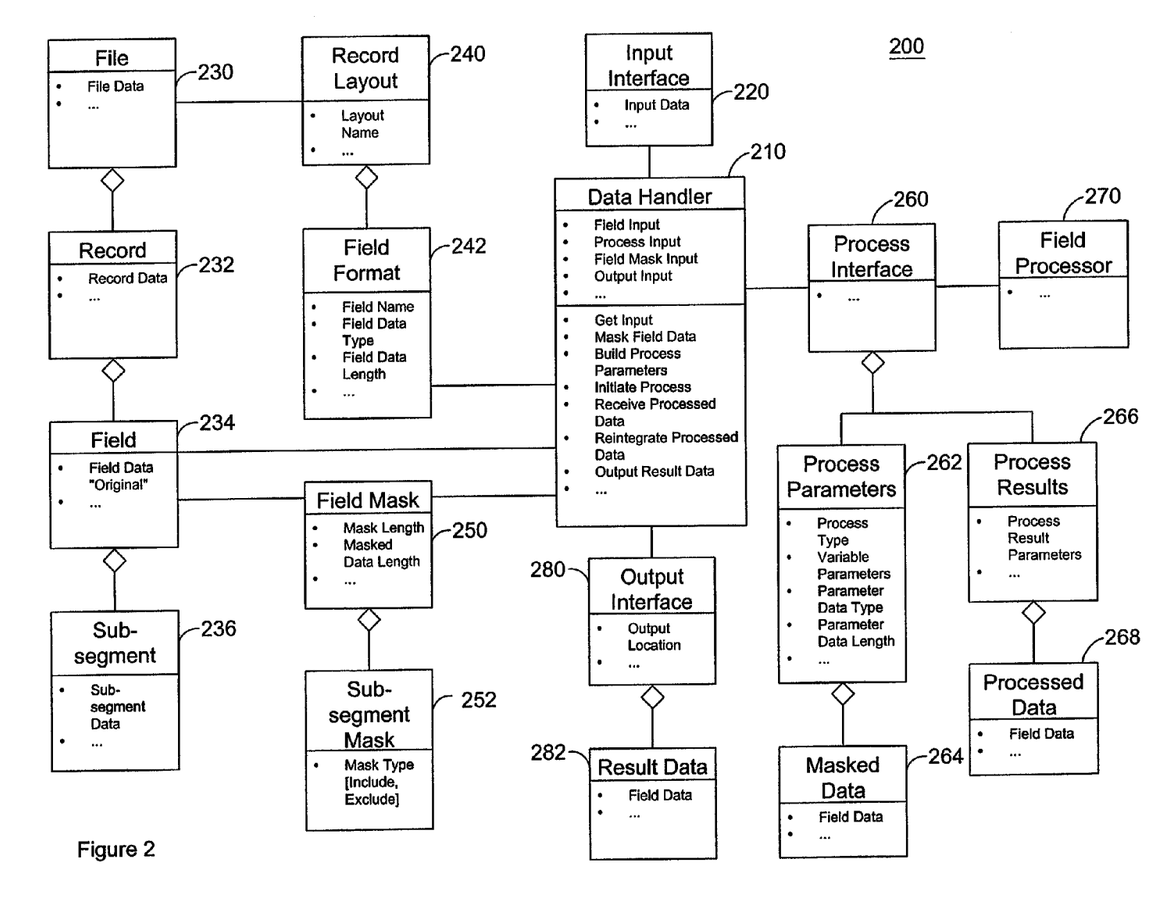
FIG. 2 is a class diagram of an example system for processing data using a data mask.

FIG. 2 shows a data processing system 200 that provides selective processing of data sub-segments within field data. Fields are the data segments in which the data processing system 200 most commonly handles data for processing. The following description will describe processing of fields and field sub-segments, but the description may be applied to processing other data segments as well.

The details of the data processing system 200 are shown as a number of classes (rectangles) and interconnecting relationships (lines). While such class diagrams are commonly used to represent object-oriented programs, they are equally applicable to describing many types of systems and software. The use of class diagrams is not intended to imply that the use of object-oriented programming is necessary or preferred in implementing the described embodiment. The classes shown are abstractions that may be embodied in a variety of corresponding objects. The embodying objects may include software modules, hardware modules, messages, interfaces, data sets, and combinations thereof. Example objects are provided in the descriptions below, but alternate embodiments are also possible. The classes and relationships shown may represent only a portion of the resources and relationships contained in the data processing system 200.

Because class diagrams may be unfamiliar to some people of skill in the art and diagramming conventions may vary, a brief summary of diagram syntax is provided here. Each class element includes a class name in its top most portion. Classes may also include a number of descriptive attributes and operations common to the class. The portion of the class element below the class name includes a list of one or more attributes associated with the class. The portion of the class element below the attributes includes a list of operations associated with the class. It is not necessary to show all, or sometimes any, of the attributes and operations of a class. For example, a class may be represented by a class element with only class name shown or with only class name and attributes. An ellipsis in either the attribute list or operations list shows that additional attributes or operations may also be present in the class and its corresponding objects. The operation portion of the class element is left off or the attribute portion is left empty if there is no need to show operations or attributes respectively. Attributes and operations are sometimes truncated or omitted for brevity and to limit the diagram to more important aspects of the classes. It is understood that additional attributes and operations may be involved in implementing the class, but the classes as shown and described provide sufficient information to guide the implementation of embodying objects.

Lines interconnect the various classes. The lines represent relationships between the classes and objects embodying the classes. Relationships may include use, communication, access, creation, destruction, modification, conceptual relationships, and other relationships. Relationship lines passing through a diamond represent aggregation. The class adjacent the diamond includes the interconnected classes as portions of itself. Conceptual aggregations may also be possible, where the aggregator is an abstraction or type for the aggregated classes. Relationships are not necessarily one-to-one. One-to-many, many-to-many, and other relationships are also possible. Where relationship between multiple objects embodying a class is relevant, it will be apparent from the description.

FIG. 2 shows a data handler 210, such as might be found in a data processing application associated with a data processing system. An example object embodying the data handler 210 is a set of software instructions. The data handler 210 coordinates the pre-processing and post-processing of data fields. The data handler 210 receives input data through an input interface 220 and accesses other resources in the data processing system 200, such as a file 230 or other data source and a record layout 240. The data handler 210 utilizes a field mask 250 to select field data to be processed. The data handler 210 communicates the field data and other parameters through a process interface 260 to initiate processing by a field processor 270. The data handler 210 also receives data back from the field processor 270 though the process interface 260. The data handler 210 post-processes the data from the field processor 270 using the field mask 250. The data handler 210 directs the resulting data through an output interface 280 to one or more uses, such as storing back in the file 230. The data handler 210 includes several relevant attributes: field input, process input, field mask input, and output input. The data handler 210 also includes several relevant operations: get input, mask field data, build process parameters, initiate process, receive processed data, reintegrate processed data, and output result data.

The field input is the input received by the data handler 210 that describes the field or fields to be processed. The field input includes a description for locating and accessing the fields. For example, the field input may include a file name or location, a name or location for a record layout or other description of the file contents, record selection criteria, and individual field names. The field input may provide for processing a series of fields, a series of records, or even a series of files.

The process input is the input received by the data handler 210 that describes the process that the field is to be processed by. The process input includes a process type selected from the process types available to the data processing system 200 through the field processor 270. The process type is used to identify a list of process parameters that should be communicated to the process and the nature of the data to be returned by the process. In the alternative, the list of process parameters may be standardized for all processes (which may or may not use all of the parameters). The process input may not include actual data for all of the process parameters. Other system resources, such as one or more data sources, may need to be utilized to complete the process parameters based upon the process input.

The field mask input is the input received by the data handler 210 that describes the field mask to be applied to the selected field to generate the field to be processed. The field mask input is generally a custom field mask input by the user while defining the processing to be done. The field mask input also includes a mask length, describing the length of the mask input by the user.

The output input is the input received by the data handler 210 that describes how the results of the process are to be output. The output input includes instructions for handling the output data. For example, the output input may include a command to overwrite the original data fields or the designation of another output file, record, or field. Alternatively, the output input may describe another output method, such as display or generation of hardcopy, or communicate the output to another system resource for further use.

Get input is the operation by which the data handler 210 gathers information from an input interface or other system resources for use in the remainder of its operations. For example, the get input operation may include a series of prompts offered to a user through a graphical user interface. The get input operation may also include one or more message prompts communicated to other system resources, such as a data source. The get input operation may include a single input gathering session, a series of input gathering sessions corresponding to the input needs of other operations of the data handler 210, or another scheme for acquiring the desired input. The get input operation is active during the pre-processing of the field data for getting all necessary input prior to initiating processing.

Mask field data is the operation by which the data handler 210 selects the sub-segments within a field that will be included in the masked data segment that is provided for processing. The mask field data operation is a pre-processing operation that is integrated with the build process parameters operation. The mask field data operation uses a field mask to determine whether each sub-segment within the field will be included or excluded in the field submitted to the processor. Further details of an example mask field data operation are provided below with regard to FIG. 3. Masking field data is an optional operation based upon whether or not a field mask is specified for the field being processed.

Build process parameters is the operation by which the data handler 210 assembles the data requirements for initiating the process. The build process parameters operation is a pre-processing operation and is be integrated with the mask field data operation. When a field mask is not specified, building process parameters involves assembling the parameters corresponding to the selected process based upon the specified field. When a field mask is specified, the process parameters are built upon the masked field, rather than the original field. The build process parameters operation initially assembles process parameters based the selected field and the process parameters are then overwritten by the mask field data operation as necessitated by the field mask. For example, the field data, data length, and data type may all be changed based upon the field mask. The process parameters are built from user input or other system resources. The completed process parameters are communicated to the field processor 270 through the process interface 260. Communication of the process parameters is a part of the initiate process operation.

Initiate process is the operation by which the data handler 210 signals to the field processor 270 that the process parameters are assembled and ready for execution through the process. The initiate process operation is triggered by completion of the build process parameters operation. Alternately, additional input may be required. For example, the get input operation may include a prompt triggered by completion of the parameters that asks the user to initiate the process. Initiation of the process includes signaling the process interface 260 with an appropriate message that the process parameters are ready for processing. The initiate process operation may include validation of the assembled parameters against one or more validation conditions. Initiation of the process also initiates a monitoring routine in the receive processed data operation that waits for the processed data to be returned by the field processor 270.

Receive processed data is the operation by which the data handler 210 receives processed data back from the field processor 270 through the process interface 260. The receive processed data operation waits for a message signifying that the process is complete. The message may include the processed data. In the alternative, it may designate the location of the processed data. For example, the processed data may overwrite a location for the field data in memory accessible to the data handler 210. The receive processed data operation may include validation of the received data. The receive processed data operation also initiates post-processing of the processed data by initiating the reintegrate processed data operation. In the alternative, the receive processed data operation may cause the get input operation to prompt a user for further information before initiating the reintegrate processed data operation. Where no field mask was used, no post-processing is necessary and the processed data is handled as result data by the output result data operation.

Reintegrate processed data is the operation by which the data handler 210 reintegrates the processed field data with the original field data. The reintegrate processed data operation may also include conversion of data and updating of data type, data length, and other field format information. The reintegrate processed data operation is a post-processing operation. The reintegrate processed data operation uses the same field mask used by the mask field data operation. The processed data is reintegrated with the portions of the original field data that were excluded from processing by the mask field data operation. Further explanation of a reintegrate processed data operation is provided below with regard to FIG. 3. The reintegrate processed data operation is an optional operation even if a field mask is used. For example, it may be desirable to output only the processed data as results, without reintegration with the original field data. Upon completion, the reintegrate processed data operation initiates the output result data operation on the result data generated by reintegration.

Output result data is the operation by which the data handler 210 communicates result data to one or more output locations through the output interface 280. The output result data operation receives result data from the reintegrate processed data operation or the receive processed data operation. The result data includes field data, field format data, or other data. The output result data operation passes the result data to the output interface 280 or provides a message to the output interface 280 indicating the location of the result data. The output result data operation may pass location, protocol, or other information describing one or more output destinations. For example, destination information may be gathered by the get input operation and stored by the data handler 210 for use by the output result data operation. The destination information may include instructions for overwriting the original field, overwriting another field, writing the result field to a new data source, providing the result field to another system resource for further processing, display, hardcopy output, or another disposition of the result data.

The input interface 220 is an interface for receiving input and providing the input to the data handler 210 in a useable format. For example, an input interface object may be a GUI integrated into an embodiment of the data handler 210. In the alternative, the input interface 220 may be part of another resource within the data processing system 200. The input interface 220 includes a series of prompts, such as one or more forms presented as panels in a GUI. The prompts allow a user accessing an input device to select or otherwise input the desired information. The input interface 220 may also gather information from other system resources, such as a data source containing the required data. The input interface 220 includes an input data attribute. The input data attribute includes the data gathered by the input interface 220 through the prompts or other methods. The input data may include all or some of the field input, process input, field mask input, and output input of the data handler 210.

The file 230 is a data source for the fields to be processed by the data handler 210. The file 230 is a formatted data location complying with a particular file system. The file 230 includes a file data attribute corresponding to the actual data contained in individual file objects. The file 230 is an aggregate of record 232 and may include multiple instances thereof. An object corresponding to the file 230 is generally related to one record layout object embodying the record layout 240. The record layout 240 describes the location (e.g., by field length) and contents (e.g., by field) of sequentially located fields within. The file 230 may also include attributes related to headers, formatting, or other metadata describing the contents of the file data.

The record 232 is, in turn, an aggregate of the field 234 and may include multiple instances thereof. The record 232 is formatted according to the record layout 240. The record 232 may include a record data attribute corresponding to the actual data within individual record objects. Record objects include sequentially located field data that may also reflect a data hierarchy. The record 232 may also include attributes related to headers, formatting, or other metadata describing the contents of the file data.

The field 234 is an aggregate of sub-segment 236 and may include multiple instances thereof. The field is formatted according to the field format 242. The field may include a field data attribute corresponding to the actual data within individual field objects. The field data attribute is described as "original" because it is the base field data that is pre-processed and post-processed by the data handler 210. The field objects include binary data that is correlated to at least one sub-segment based upon a data type associated with the field in the field format 242.

The sub-segment 236 is an aggregate portion of the field 234. The sub-segment 236 is defined by the field format 242. The field format 242 includes a sub-segment data attribute. The sub-segment data attribute may describe a string of binary data corresponding to a digit, character, or other sub-segment object. However, the sub-segment data may not directly correlate to the binary data stored in the field objects. For example, the binary representation of a decimal number cannot be divided into digits without first being converted into base 10. The sub-segment 236 is the unit by which the data handler 210 selectively processes a portion of the field 234 using the field mask 250.

The record layout 240 is related to the file 230, though it may be embodied separately from it. For example, the data processing system 200 may maintain a separate library including record layout objects for describing various file objects. Thus, a single record layout object may be used by multiple file objects. The record layout 240 includes a layout name attribute by which file objects may locate and access a particular record layout object. The record layout 240 is an aggregate of field format 242 and may include multiple instances thereof. A record layout object includes a series of field format objects describing multiple fields contained in the records of a particular file. The location of a field format object in a record layout object correlates to the position of the field within a record.

The field format 242 is an aggregate portion of the record layout 240. The field format 242 defines various aspects of a field within a record. A series of field format objects defines the format of an entire record. The field format 242 includes several relevant attributes, including: a field name, a field data type, and a field length. The field name provides a name by which to locate and access a particular field. The field data type provides the data type of the particular field. The field length provides the length of the field in either binary or sub-segment terms. The field format 242 is used by the data handler 210 to identify and locate the desired fields in the file 230. The field format 242 is also used to provide information for prompting the user for input (e.g., provide a selection list of fields within a selected file or record) and in the building of process parameters.

The field mask 250 provides a template for the data handler 210 to use when masking field data and reintegrating processed field data with the original field data. The field mask is based upon the length and type of field 234. The field mask 250 is defined by the data handler 210. For example, the get input operation of the data handler 210 may be used to get the field mask. The data handler 210 uses the field format 242 for information about the field 234 in order to define the field mask 250. The field mask 250 includes several relevant attributes, including: mask length and masked data length. The mask length is equal to the combined length of the sub-segment objects in the original field object. This means that the mask length may not be the same length as the original field, depending on the correlation between the data type and the sub-segments. The masked data length is the length of the masked data. The masked data length will be the combined length of the sub-segments not excluded from the masked data. The masked data type will be the data type of the masked data. The masked data type may not be the same as the field data type of the original field. For example, the original data may be converted during the masking process into a data type that more directly correlates to the sub-segments (e.g., packed data or binary data will be converted to unsigned numeric data.) The field mask 250 is also an aggregate of the sub-segment mask 252 and may include multiple instances thereof. A field mask object includes a series of sub-segment mask objects. Additional details of the use of the field mask 250 are provided below with regard to FIG. 3.

The sub-segment mask 252 is the unit of the field mask 250 that correlates to the sub-segment 236 of the field 234. One or more sub-segment mask object makes up a field mask object. The sub-segment mask 252 defines the handling of a particular sub-segment of the field 234 during masking of the field data and reintegration of the processed data and original data. The sub-segment mask 252 includes a mask type attribute that can be either an include or an exclude. An include sub-segment mask object tells the data handler 210 to include the corresponding sub-segment from the original field in the masked field. Similarly, the include sub-segment mask object tells the data handler 210 to replace the corresponding sub-segment in the original field with the next sub-segment from the processed field when generating the result field. An exclude sub-segment mask object tells the data handler 210 to exclude the corresponding sub-segment in the original field from the masked field. Also, the exclude sub-segment mask object tells the data handler 210 not to replace the corresponding sub-segment in the original field with the next sub-segment from the processed field when generating the result field.

The process interface 260 provides an interface between the data handler 210 and the field processor 270. A process interface object is an API, function call, socket for a plug-in, or other interface for exchanging data with the field processor 270. The process interface 260 may be integrated into data handler 210. In the alternative, the process interface 260 may be part of another resource within the data processing system 200. The process interface 260 is an aggregate of the process parameters 262 and the process results 266. The process parameters 262 include process data for initiating a process in the field processor 270. The process results 266 include process data received from the field processor 270 as a result of the processing. A process interface object may include separate hardware or software modules for handling the process data for initiating the process and the process data returned after execution of the process.

The process parameters 262 provide the data for initiating a selected process in the field processor 270. An example process parameters object is a data set communicated to the field processor 270. The process parameters 262 has a number of relevant attributes, including: a process type, variable parameters, parameter data type, and parameter data length. The process parameters 262 is also an aggregate of the masked data 264. The process type defines the process to be executed by the field processor 270. The variable parameters are a catch all for the various parameters, other than the field to be processed and data related thereto, that might be needed by any given process. The variable parameters are defined by the process type but require values that are not automatically available to the field processor 270. The variable parameters may include data gotten by the get input operation of the data handler 210. For example, the variable parameters may be selected or input by a user through the input interface 220. The parameter data type is the data type in the field in the process parameters being submitted to the field processor 270. The parameter data type for masked data is equivalent to the masked data type. The parameter data type for data that is not being masked is generally the field data type of the original field. The parameter data length is the length of the field in the process parameters being submitted to the field processor 270. The parameter data length for masked data is the masked data length. The parameter data length for data that is being processed without masking is generally the field data length of the original field.

The masked data 264 is the data that is to be processed by the field processor 270. The masked data 264 is an aggregate portion of the process parameters 262. The masked data 264 is the result of the mask field data operation in the data handler 210. Note that, if a field mask is not used to mask the original data, the masked data 264 is replaced by the original field data of the field 234.

The process results 266 is the data returned from the field processor 270 as a result of the execution of the process. An example process results object would be modified data returned from the field processor 270. The process results 266 include a process result parameters attribute. The process result parameters attribute includes a definition of the field being returned by the field processor 270. For example, it may include a processed data type, a processed data length, and any number of other parameters describing or accompanying the processed data 268. The process results 266 is also an aggregate that includes the processed data 268.

The processed data 268 is the data field returned by the field processor 270. The processed data 268 includes a field data attribute that represents the processed field data.

The output interface 280 provides an interface between the data handler 210 and one or more destinations for the result data. An example output interface object is an API, function call, or other interface for passing the result data to another system resource. The output interface 280 may be integrated into the data handler 210. In the alternative, the output interface 280 may be a part of another resource of the data processing system 200. The output interface 280 includes an output location attribute. The output location attribute defines one or more output locations for the result data 282. The output locations might include a display, a printer or other hardcopy output, the original field location in the original file, another field location, record, or file, or another resource for other use.

The result data 282 is the data field returned by the data handler 210 when all processing and post-processing is complete. The result data 268 includes a field data attribute that represents the result field data to be used at the output location.

Figure 3:
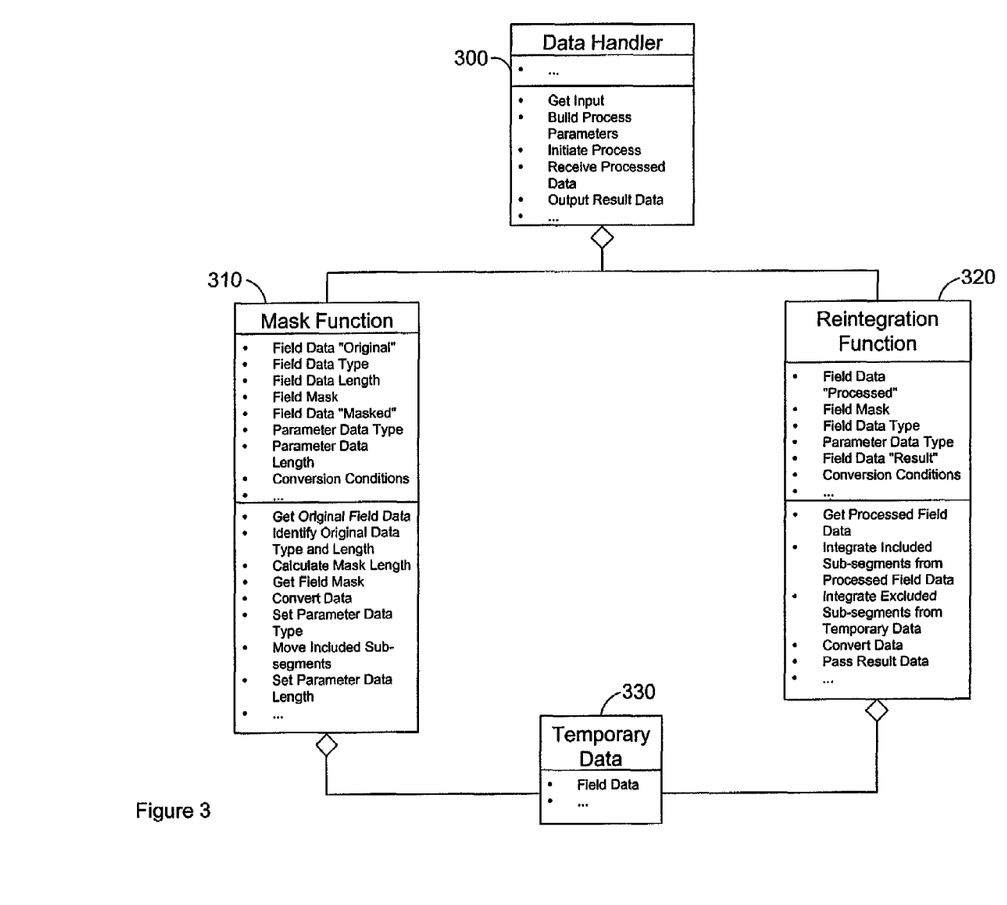
FIG. 3 is a class diagram detailing an example data handler for processing data using a data mask.

FIG. 3 shows additional details of an example data handler 300. The data handler 300 may be used in a data processing system, such as the data processing system 200 of FIG. 2. The data handler 300 oversees pre-processing and post-processing of field data that is processed in a field processing function. The data handler 300 carries out several operations, including: get input, build process parameters, initiate process, receive processed data, and output data results. Further explanation of these operations is provided above with regard to the data handler 210 of FIG. 2. The data handler 300 includes additional processes and attributes that may be more clearly explained as a mask function 310 and a reintegration function 320. The data handler 300 is an aggregate of the mask function 310 and the reintegration function 320. The mask function 310 and the reintegration function 320 are shown as aggregates of temporary data 330.

The mask function 310 masks the field data it receives using a field mask to generate masked data. The mask function 310 includes several relevant attributes, including original field data, field data type, field data length, field mask, masked field data, parameter data type, parameter data length, and conversion conditions. The mask function 310 initially generates the field data of the temporary data 330. The mask function 310 includes a number of relevant operations, including get original field data, identify original data type and length, calculate mask length, get field mask, convert data, set parameter data type, move included sub-segments, and set parameter data length.

The original field data, field data type, and field data length are attributes describing the original field data that the mask function 310 operates on. The field mask is the attribute describing the field mask used by the mask function 310 to mask the original field data. The masked field data, parameter data type, and parameter data length are attributes describing the masked field data that results from the mask function 310. The conversion conditions is the attribute describing the logic for determining the appropriate mask lengths, parameter data types, and any necessary conversions for masking the original field data.

Get original field data is the operation by which the mask function 310 accesses the original field data. For example, the mask function 310 may receive the original field data as part of a message requesting processing or may receive user input identifying the location of one or more fields within a particular data source for processing. The get original field data operation of the mask function 310 relies on the get input operation of the data handler 300. In one embodiment, the process parameters are initially built by the data handler 300 using the build process parameters operation and the original field data. The get original field data operation then operates on the field data in the process parameters based on the original field data to access the original field data. In addition to providing the original field data for masking by the mask function 310, the original field data should also be stored such that it may be accessed by the reintegration function 320 if necessary. The get original field data operation also gets the original field data's data type and data length.

Identify original data type and length is the operation by which the mask function 310 determines the original data type and the original data length. The original data type is used by the mask function 310 to guide pre-processing of the original field data, including definition of the field mask and any necessary conversions. The original data length is used by the mask function 310 to determine the length of the data mask that should be applied to masking the original data field. The identify original data type and length operation may simply reflect accessible memory locations containing the original data type and the original data length. For example, the get original field data operation may also get and store the original field data type and length in a location accessible to the mask function 310.

Calculate mask length is the operation by which the mask function 310 determines the number of sub-segments that should be present in the field mask. The length of the field mask is matched to the number of sub-segments in the original field data. In order to determine the number of sub-segments in the original field data, the calculate mask length operation evaluates the data type and data length of the original field data. For example, the number of sub-segments (i.e. digits) corresponding to a binary field type can be determined by the data length, in bytes, of the original data field. A 2 byte binary field corresponds to a mask length of 5 sub-segments. A 4 byte binary field corresponds to a mask length of 10 sub-segments. An 8 byte binary field corresponds to a mask length of 18 sub-segments. The number of sub-segments in a packed decimal field is twice the field length minus one (removal of the sign). Other data formats, such as character and unsigned numeric data, may have a mask length that corresponds directly to the original field length. The calculate mask length operation also provides a maximum mask length that truncates the field length if it exceeds a certain length. For example, specifying a field mask for fields larger than 250 characters may be unwieldy and a default maximum mask length of 250 may be set. Users are allowed to override the mask length calculated by the calculate mask length operation, including the default maximum mask length but may not exceed the maximum. Override may not be appropriate for all data types in all data processing applications. For example, the mask function 310 may not allow override of binary or packed fields. The example mask length calculations provided here are provided for illustration. Calculation of mask length from data type and field length will vary depending on individual systems and programming languages. The defined field types (or types for other data segments) and the way those field types are represented in sub-segments and stored in memory will determine the actual calculations.

Get field mask is the operation by which the mask function 310 accesses a field mask defined for masking the original field data. The get field mask operation allows the user to define a custom field mask for the process to be executed. Other examples of a get field mask operation include: selecting a field mask from a source of pre-defined field mask options or patterns, and accessing predefined field mask supplied with the original field data or from some other source. The get field mask operation is a part of the get input operation of the data handler 300. For example, the get field mask operation may include prompting a user through a GUI to enter a field mask of the mask length calculated by the calculate mask length operation. The user enters a sub-segment mask (includes and excludes) for each sub-segment in the calculated mask length. In one embodiment, each sub-segment mask is represented by an exclude symbol (e.g., "N") or an include symbol (e.g., "Y"). The string of include/exclude symbols corresponding to the mask length is the field mask. In alternate embodiments, the field mask is selected from a menu of field mask options of the appropriate mask length or the mask is predefined and stored in an accessible location.

Convert data is the operation by which the mask function 310 converts the data type of the original field if necessary. As discussed above, the sub-segments of some data types do not correspond directly to the way the field is stored (e.g., bytes of data). Masking the original field data is made easier by first converting the original field data into a data type that more directly corresponds to the sub-segments to be manipulated. Depending on the identified data type, the convert data operation may convert the original data type into another data type. For example, binary data and packed data is converted to unsigned numeric data or the sign is removed from signed numeric data to convert it into unsigned numeric data. The converted data is stored to the temporary data 330. Other data types do not require any data conversion and are stored to the temporary data 330 without change. Where a mask length is set to less than the data length of the original or converted field data, the convert data operation truncates the data field to a length equal to the mask length. In one embodiment, all field data is initially written to the temporary data 330 and converted data overwrites the temporary data 330 if conversion is necessary. The field data in temporary data 330 will correlate directly to the sub-segments of the original field data and the field mask following the covert data operation. As with calculating the mask length, the data types and their handling are examples only and the data types and conversion will depend on the data types defined within the specific data processing system or programming languages related thereto.

Set parameter data type is the operation by which the mask function 310 ensures that the parameter data type to be passed to the field processor is the same as the data type of the pre-processed field data. More specifically, the set parameter data type operation makes sure that data conversions are reflected in the processing parameters. If the data type is converted by the convert data operation, the parameter data type is set to equal the data type of the converted data (e.g., unsigned numeric). The parameter data type is initially set according to the data type of the original field type and overwritten if the field data is converted to another type. In the alternative, the parameter data type may not be set until after any conversion is complete and will be set to the data type of the temporary data 330.

Move included sub-segments is the operation by which the mask function generates masked data that includes only the included sub-segments and excludes the excluded sub-segments. The data mask is used as a template to determine the handling of each sub-segment in converted field data or the original field data if the data is not converted. For example, the move included sub-segments operation operates on the temporary data 330. The move included sub-segments operation defines logic for generating a masked data field. For example, the move included sub-segments operation may step through the sub-segments of the field data and the sub-segment masks of the data mask. If the sub-segment mask is an include symbol, the corresponding field data sub-segment is moved into the masked data. If the sub-segment mask is an exclude symbol, the corresponding sub-segment is not moved into the masked data. In either case, both the sub-segment and the sub-segment mask are incremented (e.g., by byte/digit/sub-segment) to the next sub-segment in their respective field and field mask. The masked field data is moved into the parameter field data. In one embodiment, the included segments are written directly into the parameter field data from the temporary data 330 and the temporary data 330 is left unchanged.

Set parameter data length is the operation by which the mask function 310 sets the parameter data length equal to the masked data length. The masked data length is equal to the number of included sub-segments in the data mask times the data length of the sub-segments corresponding to the mask field type. The masked data length is calculated during the move included data sub-segments operation by incrementing the masked data length each time an included sub-segment is moved into the masked data field. The masked data length overwrites the parameter data length for submission to the field processor. Once the masked field data, masked data type, and masked data length are written into the processing parameters, the mask function 310 is complete and the data handler 310 initiates processing of the masked field data.

The reintegration function 320 reintegrates the processed field data received by the data handler 300 with the excluded sub-segments from the original field data or corresponding converted field data. The reintegration function 320 includes several relevant attributes, including processed field data, field mask, field data type, parameter data type, result field data, and conversion conditions. The reintegration function 320 also utilizes the field data of the temporary data 330 corresponding to the original field data or corresponding converted data. The reintegration function 310 includes a number of relevant operations, including: get processed data, integrate included sub-segments from processed data, integrate excluded sub-segments from temporary data, convert data, and pass result data.

The processed field data and the parameter data type are attributes describing the processed field data returned by the field processor and operated on by the reintegration function 320. This assumes that the field processor returned the same data type that is passed to it. In an alternate embodiment, the parameter data type is replaced by a processed data type generated by the field processor. The field mask is the attribute describing the field mask used by the reintegration function 310 to reintegrate the processed field data with the excluded portions of the original data or corresponding converted data in the temporary data 330. The field data type is an attribute describing the original field data and is used by the reintegration function 320 to determine whether the reintegrated data needs to be converted back to the data type of the original field data. The conversion conditions is the attribute describing the logic for determining any necessary conversions for generating result data of a data type that matched the original field data. The result field data is the field data that the reintegration function generates and returns.

Get processed field data is the operation by which the reintegration function 320 receives the field data processed by the field processor. For example, the reintegration function 310 may receive a message containing the processed field data and other data returned by the field processor. In the alternative, the processed field data may be stored in a location accessible to the reintegration function 310. The get processed field data operation is initiated when the processed field data is available or received. The get processed field data operation also gets the processed field data's data type, data length, and other data resulting from the executed process of the field processor. Completion of the get processed field data operation initiates further processing by the integrate included data sub-segments from the processed data field operation and the integrate excluded data-sub-segments from the temporary data field.

Integrate included data sub-segments from processed data field is the operation by which the reintegration function 320 positions processed data sub-segments in the result field data. The integrate included sub-segments operation operates in conjunction with the integrate excluded data sub-segments from the temporary data to build the result field data. The integrate included sub-segments operation determines the position for each sub-segment from the processed data field in the result data field. The field mask provides a template for positioning the sub-segments. The field mask and the processed field data are processed in tandem by stepping sequentially through their respective sub-segments. An include sub-segment in the field mask indicates that the next sub-segment in the processed field data should be moved into the result data field. An exclude sub-segment in the field mask means that a sub-segment from the original field data or temporary data should be moved into the result data field. The temporary field data or a location containing the original field data are used to build the result field data. Sub-segments from the processed field data will overwrite the original or temporary field data that correspond to the include sub-segments of the field mask. In an alternate embodiment, the sub-segments from the original or temporary field data are moved into the processed field. Sub-segments from the processed field data are displaced to make room for the inserted sub-segments from the original or temporary field data.

Integrate excluded sub-segments from the temporary field data is the operation by which the reintegration function 320 positions the original or temporary field data in the result field data. The integrate excluded sub-segments operation reintegrates the sub-segment data excluded by the field mask in the mask function 310. The reintegrated sub-segments may be sub-segments of the original field data or may be sub-segments of the corresponding converted field data. The original field data or its corresponding converted field data may be stored in temporary data 330. The integrate excluded sub-segments operation operates in conjunction with the integrate included sub-segments operation. The integrate excluded sub-segments uses the field mask to determine whether each sub-segment should be made part of the result field data. An exclude sub-segment means that the corresponding sub-segment in the temporary data should be made part of the result field data. An include sub-segment means that the corresponding sub-segment in the temporary data should not be made a part of the result field data. The temporary field data is reintegrated with the processed field data by moving sub-segments from the processed field data into the temporary field data. The temporary field data is processed in parallel with the field mask and the processed field data. Sub-segments in the temporary field data are skipped if the corresponding sub-segment mask is an exclude and are overwritten by a sub-segment from the processed field data if the corresponding sub-segment mask is an include. In alternate embodiments, the result data is built in a new data location or in the processed field data. The result data should be field data of the same data type and data length as the temporary data field.

Convert data is the operation by which the reintegration function 320 converts the reintegrated field data back to the data type of the original field. If the original field data was converted as part of the pre-processing prior to submission to the field processor, conversion back to the original field data type may be desirable. The convert data operation compares the original field data type to the parameter data type to determine whether or not to convert the data. The parameter data type is used in situations where the field processor receives and returns the same data type. Otherwise, a separate data type for the processed data may be used to determine any conversion. In the alternative, the conversion may be determined entirely by the original field data type based upon an understanding of the conversion conditions used by the mask function 310. For example, if the original data type was binary, packed, or signed numeric, the data was converted into unsigned numeric by the mask function 310. The reintegrated temporary data would also be unsigned numeric. The convert data operation would identify the original data type as binary, restore the original sign, and convert back to binary. If the convert data operation identified the original data type as packed, the convert data operation would restore the original sign and convert the data back to packed. If the convert data operation identified the original data as signed numeric, the original sign would be restored. Note that, in order to restore the sign, the data handler 300 must record the original sign for later use. One method of retaining the original sign data is to retain at least one memory location containing the original data. In the alternative, a separate variable may be used to track the original sign or other data that may be lost through conversion. Once the reintegrated data is converted back to the original data type, the result field data may be prepared for the pass result data operation.

Pass result data is the operation by which the result data is designated ready for output by the data handler 300. The pass result data operation identifies completion of the post-processing. The pass result data operation may communicate by state information, message, or other indicator that the result data is prepared for output. Output may then be handled by the output result data operation of the data handler 300.

Figure 4:
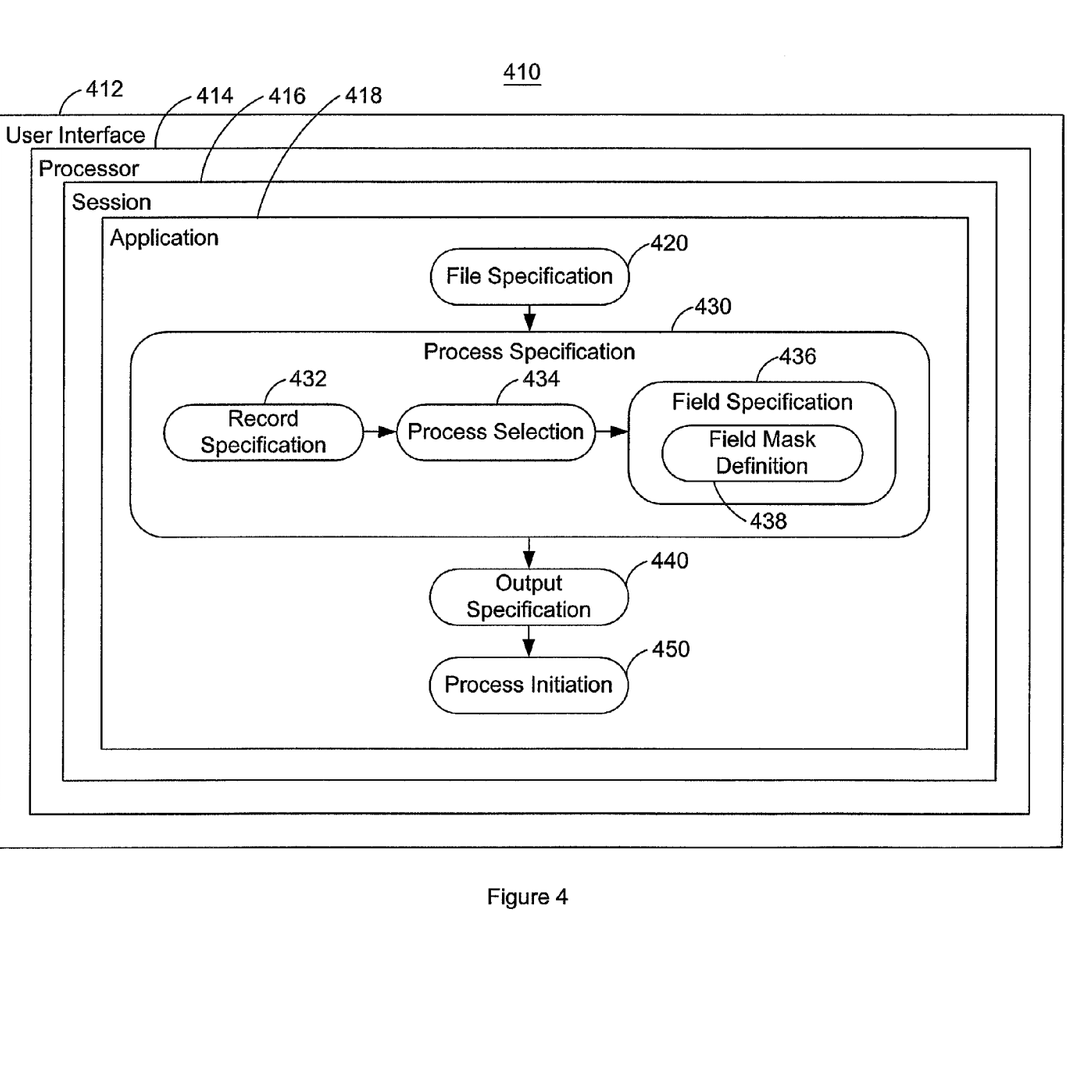
FIG. 4 is an activity diagram for an example interface for a system for processing data using a data mask in an example environment.

FIG. 4 shows the steps in an example interface for a data processing system that uses field masking as described above. The steps are shown within the context of an example environment that might employ such a data processing scheme. The computing environment 410 includes an interface layer 412, a processor layer 414, a session layer 416, and an application layer 418. The interface layer 412 includes the hardware, software, and communication protocols by which a user accesses the data processing system. For example, the interface layer might include a personal computer or terminal running OS/2™, Windows™, or another operating system and using TCP/IP or another communications protocol. The processor layer 414 represents a connection between the interface layer and a centralized processing site, such as a mainframe computer. One embodiment of the processor layer is an IBM™ z800 Mainframe Server or other conventional server technology for hosting data management applications. The session layer 416 includes a server or batch session for accessing the processing capabilities of the processing site. For example, the session layer 416 may include an MVS™ TSO/ISPF session via VTAM, TCAM, or another access method. The session layer 416 may define a menu or another method of selecting one or more applications available at the processing site. For example, the session layer 416 may define an ISPF Primary Option Menu offering several application options. The application layer 418 represents the interface of a specific application selected by the user. For example, the user may select a data processing application from the Primary Option Menu. The application layer 418 may include a series of screens and prompts to allow a user to initiate one or more selected data processing tasks. For example, the user may be prompted to identify one or more fields for processing through a field mask.

The application interface defines a number of steps 420–450 for initiating a data processing routine using a field mask. In step 420, a file for processing is specified. In step 430, the process to be executed on the file data is specified. In step 440, the output form and location may be specified. In step 450, processing of the file data is initiated. Note that the steps 420–450 may be embedded within the application interface and may be only a portion of the functions available through the application.

In step 420, the user may define an input file to be accessed by the data processing application. Step 420 may be repeatedly executed for specifying multiple files for processing. For example, the user may be prompted after each file is processed as to whether or not the user would like to process another file. If the user decides that no further files need to be processed, the application interface may return to a menu of application functions from which the file processing was selected. Definition of the input file may include the specification or selection of one or more designations by which a file and the data within are described. For example, the definition of the input file may include input of a file name, one or more record layout names, and other information. Once the file is defined, the interface may proceed to step 430.

In step 430, the user may define the field processing to be executed by the data processing application. Definition of the field processing includes specifying both the data within the selected file to be processed and the process by which the data is to be processed. Once the field processing is defined, the interface may proceed to step 440. Step 430 may include several sub-steps that further describe the steps of defining the field processing. In step 432, one or more record layouts are specified. In step 434, one or more processes are selected. In step 436, one or more fields from the records are specified. Part of the field specification may include step 438, field mask definition. Field mask definition effectively specifies one or more sub-segments to be processed from the specified fields.

In step 432 one or more record layouts are selected. Selection of the records to be processed may include specifying one or more groups of records within the selected file. For example, the user may select a specific record layout from one or more record layouts associated with the file. Selection of the records to be processed may also include further limiting the set of records to be processed. For example, the user may define one or more keys or conditions by which individual records may be evaluated on their content for inclusion in the set of records to be processed. Once the record set is selected for processing, the interface may continue to step 434. Multiple record sets may be selected and processed in sequence. When the processing of each record set is complete, the interface may return to step 434. The user may be prompted as to whether the user wishes to specify another record set or not. If not, the user may be returned to the file specification step 420.

In step 434 one or more processes are selected for processing fields in the selected records. The processes may include a wide variety of field processing routines of varying complexity. The data processing application may define a set of available processes. The data processing application may also allow users to provide their own custom processing routines or may be able to access an external library of processes. The processes accept a predefined set of process parameters, including at least one field. The process parameters may include one or more variable parameters in addition to the field data. These additional parameters may be input by the user when the process is selected or may be gotten from some other system resource. Once the process is selected, the interface may continue to step 436. A process may be executed multiple times on a given record set or multiple processes may be executed in sequence on a record set. For example, the interface may return to step 434. The user may be prompted after each process is executed whether the user wishes to select another process to have executed. If no further processing is desired, the user may be returned to the record specification step 432.

In step 436 one or more fields are selected for processing from the selected records. Selection of the fields to be processed may include identifying one or more field identifiers. For example, the user may select one or more field names from the fields available in the record layout for the selected records. For each field selected, the user may have the option of defining a field mask, step 438. Once the fields are selected for processing and any field masks are defined, the interface may continue to step 440. The interface may also allow the user to specify additional records, processes, and fields before continuing to output specification in step 440.

In step 438 a field mask may optionally be defined for each field selected in step 436. For example, the user may be offered the option of defining a field mask or processing the entire field. If a field mask is desired, the interface may prompt a user to define an appropriate field mask. For example, the data processing application may calculate a mask length based upon the data length and data type of the selected field. An appropriate field mask may be provided. Definition of the field mask may include selection of a mask of predefined length and pattern from a list of options, accessing a predefined custom pattern, or allowing a user to define a custom field mask through the interface. Custom field mask definition may allow a user to specify include and exclude segments according to the number of segments calculated in the mask length. The interface may also allow the user to override the default mask length to define a shorter or longer field mask for some fields. Once a field mask is defined for a particular field, the user may be given the option to select additional fields in step 436.

In step 440 an output location is specified for the results of the field processing. The user may be able to direct the output of the results to one or more locations. For example, the user may be allowed to specify whether the data is to overwrite the data in the selected file. The user may be able to specify that the data be copied to a new file or another pre-existing file. If another file is specified, the file name or another file identifier may be provided. Additional information may also be appropriate to define the location and format of the result output. The user may be able to specify one or more other output methods, such as through a printer. One or more default outputs may be provided for the result data, such as display to the screen or recordation in a data management audit log. These defaults may or may not be capable of being overridden. Once the output location is defined, the interface may continue to step 450.

In step 450 the specified process is initiated. Once the process is initiated, the selected fields and field sub-segments are accessed, pre-processed, processed, post-processed, and output as defined. Once processing is complete, the interface may allow the user to define additional processing by repeating one or more of steps 420–450.

Other environments and interfaces for implementing the data processing systems and methods described above with regard to FIGS. 1–3 will be apparent to those of skill in the art.

The invention claimed is:

1. A method for processing a data segment, comprising:
receiving an original data segment, wherein the original data segment is a field within a row of a table;
receiving a data type of the original data segment that defines a plurality of sub-segments that compose the original data segment;
receiving a set of exclusion instructions that specifies one or more sub-segments, as defined by the data type of the original data segment, to exclude;
creating a masked data segment by excluding, based on the data type of the original data segment and based on the set of exclusion instructions, at least one sub-segment from the plurality of sub-segments; and
communicating the masked data segment to a process that returns a processed data segment.

2. The method of claim 1, further comprising combining the original data segment and the processed data segment to create a result data segment.

3. The method of claim 2, wherein combining the original data segment and the processed data segment to create a result data segment comprises using a segment mask to combine the original data segment and the processed data segment to create a result data segment.

4. The method of claim 2, wherein combining the original data segment and the processed data segment comprises combining the at least one sub-segment excluded from the plurality of sub-segments and the processed data segment.

5. The method of claim 4, wherein the result data segment comprises the original data segment modified so that a sub-segment included in the masked data segment is replaced by a sub-segment of the processed data segment.

6. The method of claim 2, wherein the original data segment and the result data segment have a first data length equal to a number of sub-segments in the original data segment.

7. The method of claim 6, wherein the masked data segment has a second data length equal to the difference between the first data length and a number of sub-segments excluded from the plurality of sub-segments.

8. The method of claim 1, wherein the least one sub-segment excluded from the plurality of sub-segments is selected for exclusion using a segment mask.

9. The method of claim 8, wherein the segment mask comprises a plurality of sub-segment masks.

10. The method of claim 9, wherein the sub-segment mask indicates whether to exclude a sub-segment in the masked data segment.

11. A computer program product for processing a data segment, the computer program product comprising a computer-readable medium, the computer-readable medium comprising:
program code configured to receive an original data segment, wherein the original data segment is a field within a row of a table;
program code configured to receive a data type of the original data segment that defines a plurality of sub-segments that compose the original data segment;
program code configured to receive a set of exclusion instructions that specifies one or more sub-segments, as defined by the data type of the original data segment, to exclude;

program code configured to create a masked data segment by excluding, based on the data type of the original data segment and based on the set of exclusion instructions, at least one sub-segment from the plurality of sub-segments; and program code configured to communicate the masked data segment to a process that returns a processed data segment.

12. A system including a processor for processing a data segment comprising:

a data segment receiving module configured to receive an original data segment, wherein the original data segment is a field within a row of a table;

a data type receiving module configured to receive a data type of the original data segment that defines a plurality of sub-segments that compose the original data segment;

an exclusion instruction receiving module configured to receive a set of exclusion instructions that specifies one or more sub-segments, as defined by the data type of the original data segment, to exclude;

a creation module configured to create a masked data segment by excluding, based on the data type of the original data segment and based on the set of exclusion instructions, at least one sub-segment from the plurality of sub-segments; and a communication module configured to communicate the masked data segment to a process that returns a processed data segment.

* * * * *